United States Patent [19]

Johansen et al.

[11] Patent Number: 5,652,735
[45] Date of Patent: Jul. 29, 1997

[54] ACOUSTIC SOURCE ASSEMBLY

[75] Inventors: Svein Egil Johansen, Oslo; Tor-Arvid Haugland, Rykkinn, both of Norway; Thomas Clive Snook, Oegstgeest, Netherlands

[73] Assignee: Petroleum Geo Services AS, Norway

[21] Appl. No.: 551,678

[22] Filed: Nov. 1, 1995

[30] Foreign Application Priority Data

Nov. 2, 1994 [NO] Norway ................................ 944169

[51] Int. Cl.$^6$ .................................................. H04R 1/44
[52] U.S. Cl. ................................. 367/153; 367/174
[58] Field of Search .............................. 367/174, 163, 367/154, 153, 142, 138; 181/110

[56] References Cited

U.S. PATENT DOCUMENTS

| | | | |
|---|---|---|---|
| 4,845,688 | 7/1989 | Butler | 367/174 |
| 4,914,636 | 4/1990 | Garrotta | 367/56 |
| 4,918,668 | 4/1990 | Sallas | 367/22 |
| 4,941,202 | 7/1990 | Upton | 367/165 |
| 4,956,822 | 9/1990 | Barber et al. | 367/144 |
| 5,005,665 | 4/1991 | Cheung | 367/9 R |
| 5,070,486 | 12/1991 | Boucher | 367/155 |
| 5,237,543 | 8/1993 | Erickson et al. | 367/163 |
| 5,276,657 | 1/1994 | Newnham et al. | 367/163 |
| 5,281,773 | 1/1994 | Duren | 367/15 |
| 5,291,461 | 3/1994 | Boeglin et al. | 367/163 |
| 5,329,499 | 7/1994 | Molund et al. | 367/174 |

FOREIGN PATENT DOCUMENTS

| | | |
|---|---|---|
| 162134 | 2/1989 | Norway . |
| 911201 | 3/1991 | Norway . |

*Primary Examiner*—Daniel T. Pihulic
*Attorney, Agent, or Firm*—Gordon T. Arnold

[57] ABSTRACT

Acoustic source assembly for offshore seismic exploration, comprising at least one active vibration transducer (1) adapted to be excited by a sweep signal within a desired frequency range. At least one further and passive vibration transducer (2,3) is positioned at such small spacing (B) between the transducers that interaction therebetween provides for a relative enhancement of the frequency response of the whole source assembly at low frequencies.

5 Claims, 2 Drawing Sheets

ACOUSTIC SOURCE ASSEMBLY

BACKGROUND OF THE INVENTION

This invention relates to marine seismic methods and more particularly to acoustic sources for use in offshore seismic exploration.

As distinguished from the "explosive" acoustic impulse sources such as air guns being known for a long time, vibration sources or transducers, in particular so-called flextensional transducers have been employed in seismic exploration in recent years. The invention is based on the utilization of such vibration transducers, i.e. flextensional transducers or other types of vibrational devices, including transducers of the piston type.

Examples of known flextensional transducers are found, inter alia, in Norwegian Patent No. 162,134 and U.S. Pat. No. 5,005,665. Both these known devices are somewhat special and directed to onshore seismic exploration. Known examples of acoustic source arrays or subarrays for seismic purposes, including among other things also vibration units or transducers, are found in U.S. Pat. Nos. 4,914,636, 4,918,668 and 5,281,773. None of these however, are particularly related to enhancement of the low frequency power of the acoustic-source.

Moreover, reference is made to an article in Geophysical Prospecting, 1980, 28, 323–332, by J. E. Sinclair and G. Bhattacharya: "Interaction effects in marine seismic source arrays". What is described therein are effects being obtained when acoustic sources in an array have a relatively large mutual spacing, ie. being outside the near field of each other.

A problem in connection with vibration transducers is to obtain a desired high acoustic power output at low frequencies, such as in the range down towards 100 Hertz. An improved low frequency response can be obtained by increasing the dimensions of the transducer units, but this involves practical and cost drawbacks.

SUMMARY OF THE INVENTION

Thus on the background of the generally known techniques the invention takes as a starting point an acoustic source assembly for offshore seismic exploration, comprising at least one active vibration transducer adapted to be excited by a sweep signal within a desired frequency range. What is novel and specific in the assembly according to the invention in the first place is characterized by providing at least one further and passive vibration transducer positioned at such small spacing between the transducers that interaction therebetween provides for a relative enhancement of the frequency response of the whole source assembly at low frequencies.

A particularly preferred form of vibration transducers in the assembly according to the invention, are flextensional transducer units, which can be of designs known per se.

BRIEF DESCRIPTION OF THE DRAWINGS

In the following description the invention will be explained more closely with reference to the drawings, wherein.

DETAILED DESCRIPTION OF THE INVENTION

Figure 1:
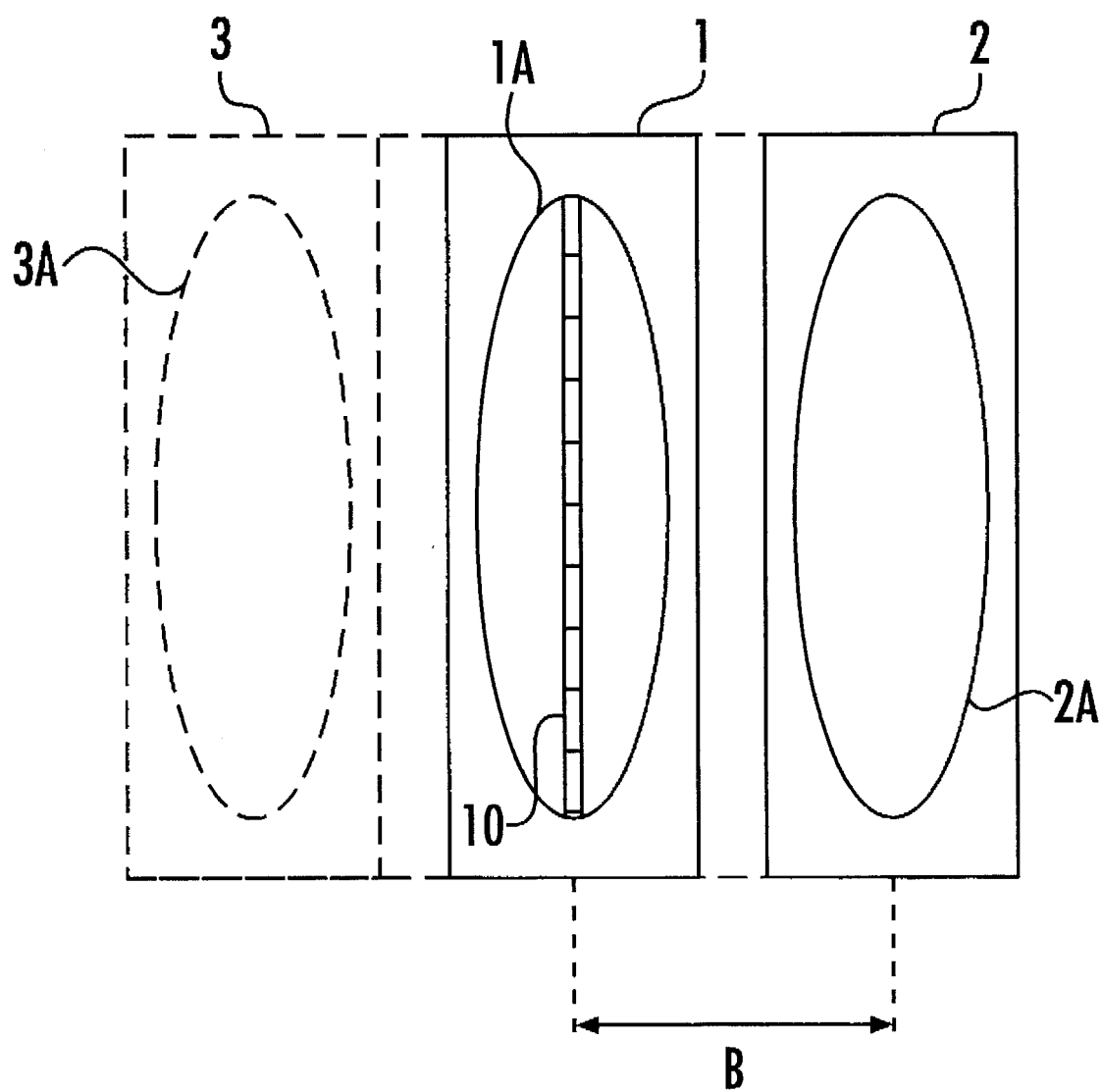
FIG. 1 shows the principles of an acoustic source assembly according to the invention.

As illustrated in FIG. 1 there are provided two or more vibration transducers 1, 2, 3 at a relatively small mutual spacing, so that there will be an interaction between these transducers when excited. As known this excitation, i.e. the drive signal applied, will be swept in frequency within the desired frequency range.

Purely schematically and simplified FIG. 1 shows these transducer units 1, 2 and 3 provided with flextensional transducer shells 1A, 2A and 3A respectively, whereby a surrounding frame or the like being of a rectangular shape, is indicated. In this embodiment transducer 1 is an active transducer, which comprises a drive element 10 based on for example the magnetostrictive effect, as previously known. The transducer 2 however, in this case is not provided with any drive element, which means that this transducer can be referred to as passive. The same applies to unit 3 which is only shown in dotted lines. The present proposal in the principle relates to arrangements with two or more transducer units assembled.

When unit 1 is excited the one or more additional units 2 and possibly 3, will also co-vibrate because of the proximity to unit 1, and surprisingly it has been found that such an interaction involves an improve frequency response.

Such an effect occurs only when the two or more units have a sufficiently small mutual spacing, as designated B in FIG. 1, taken as the center spacing between units 1 and 2. As expressed in popular seismic terminology the effect referred to here can be regarded to occur when the transducer units are positioned within the near field of one another.

In the example of FIG. 1 only one of the units, namely transducer 1, is provided with a drive element 10, whereas the others are passive. The effect referred to here may also be found when two or more of the units in the assembly are active, i.e. being of the excited type.

Figure 2A:
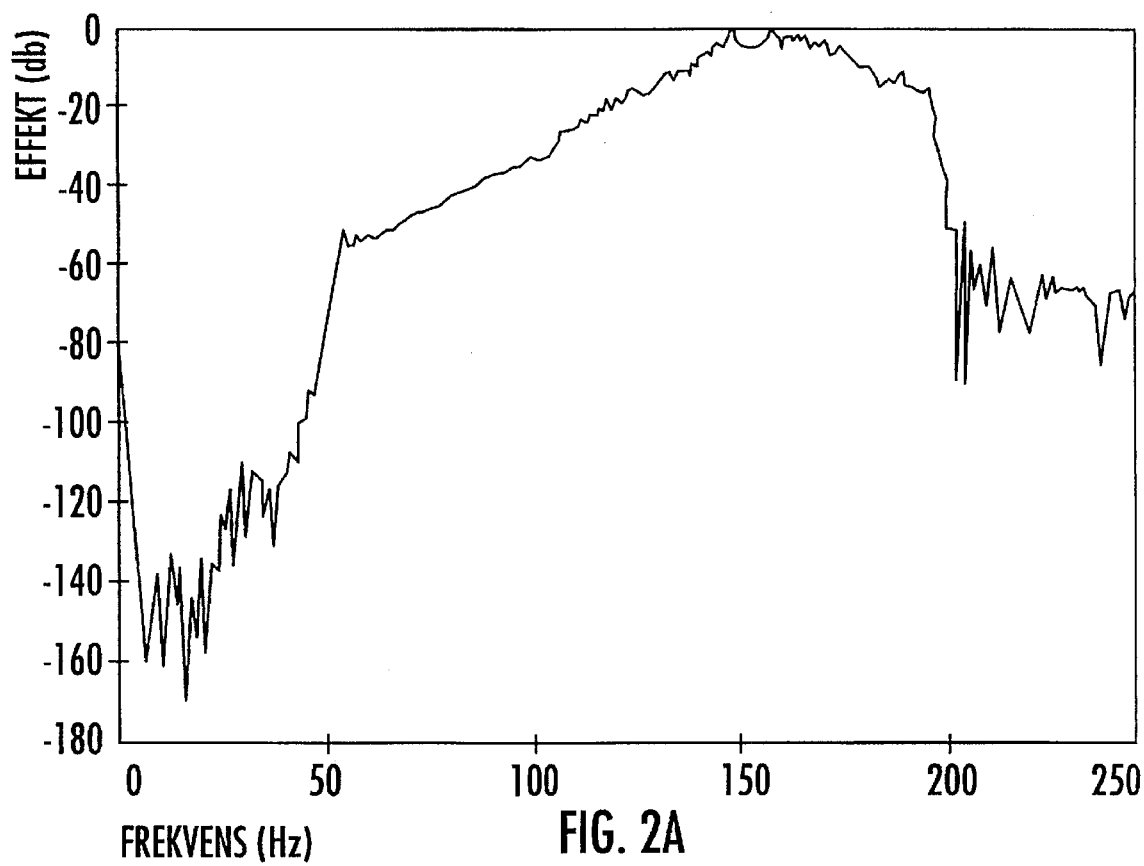
FIG. 2 shows diagrams for illustrating the improved low frequency response made possible by means for the invention.
Figure 2B:
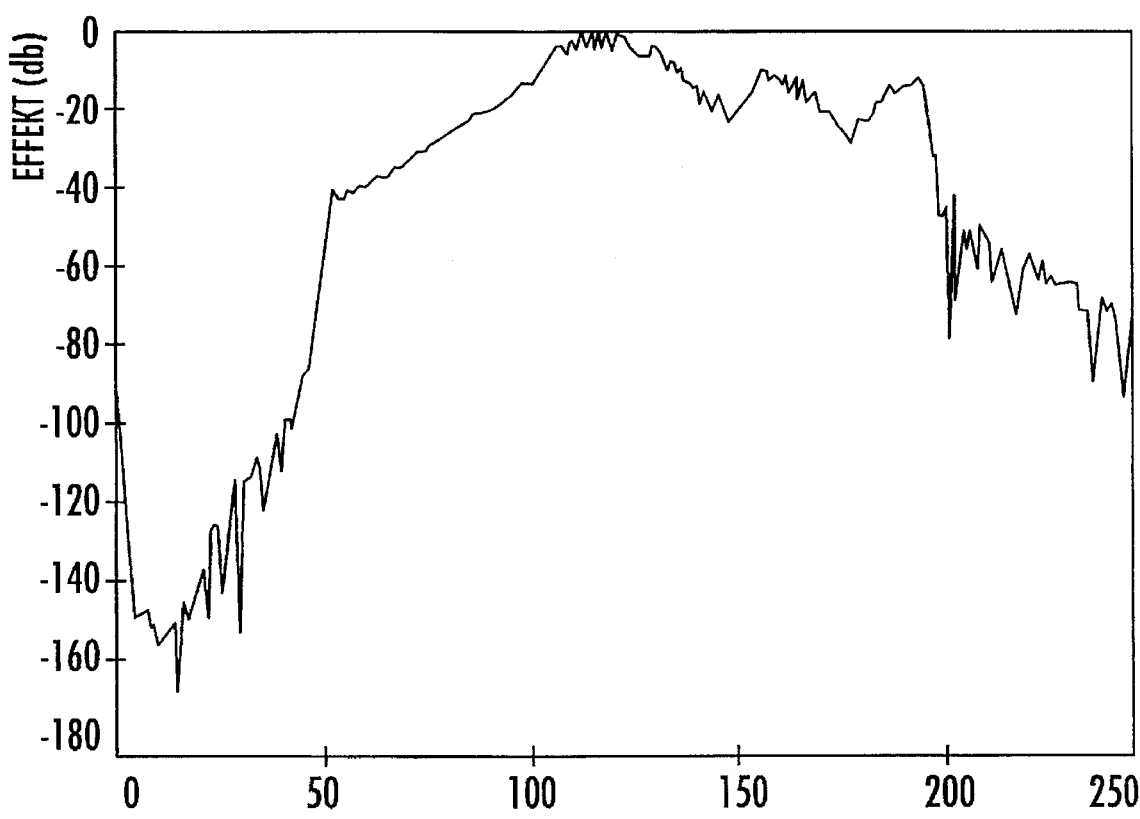

The curves in diagrams A and B in FIG. 2 show an example of improvement of the low frequency response, whereby diagram A represents the frequency response of an active transducer source alone, whereas diagram B shows the same active unit in cooperation with a corresponding, but passive unit positioned at a small (in practice minimum) spacing from the active unit. The low frequency response is significantly better in diagram B.

We claim:

1. An acoustic source assembly for offshore seismic exploration, the assembly comprising: an active vibration transducer which is excitable by a sweep signal within a desired frequency range; and a passive vibration transducer, wherein said active vibration transducer and said passive vibration transducer are positioned within the near field of each other, whereby interaction there between provides for a relative enhancement of the frequency response of the whole source assembly at low frequencies.

2. An acoustic source assembly according to claim 1, wherein said passive vibration transducer comprises a flextensional transducer unit.

3. An acoustic source assembly according to claim 1, wherein at least some of said transducers' main sound-emitting surfaces face one another.

4. An acoustic source assembly according to claim 1, further comprising a plurality of active vibration transducers.

5. An acoustic source assembly according to claim 1, further comprising a plurality of passive vibration transducers.

* * * * *